US007475800B2

(12) United States Patent
Liang

(10) Patent No.: US 7,475,800 B2
(45) Date of Patent: Jan. 13, 2009

(54) TRIGGER VALVE FOR PNEUMATIC NAIL GUN

(75) Inventor: Chia-Sheng Liang, Taipei Hsien (TW)

(73) Assignee: DePoan Pneumatic Corp., Taipei (TW)

( * ) Notice: Subject to any disclaimer, the term of this patent is extended or adjusted under 35 U.S.C. 154(b) by 0 days.

(21) Appl. No.: 11/742,677

(22) Filed: May 1, 2007

(65) Prior Publication Data

US 2008/0272169 A1 Nov. 6, 2008

(51) Int. Cl.
*B23C 1/04* (2006.01)
*B25C 1/08* (2006.01)

(52) U.S. Cl. ............................ 227/130; 227/8; 227/129

(58) Field of Classification Search ................. 227/130, 227/8, 129

See application file for complete search history.

(56) References Cited

U.S. PATENT DOCUMENTS

| | | | | |
|---|---|---|---|---|
| 3,771,710 | A * | 11/1973 | Perkins et al. | 227/130 |
| 4,122,904 | A * | 10/1978 | Haytayan | 173/15 |
| 4,404,894 | A * | 9/1983 | Oesterle | 91/461 |
| 4,811,882 | A * | 3/1989 | Steeves et al. | 227/8 |
| 5,687,897 | A * | 11/1997 | Fa et al. | 227/8 |
| 5,785,228 | A * | 7/1998 | Fa et al. | 227/8 |
| 5,911,351 | A * | 6/1999 | White | 227/130 |
| 5,924,621 | A * | 7/1999 | Hung | 227/130 |
| 6,533,156 | B1 * | 3/2003 | Chang | 227/130 |
| 6,695,193 | B1 * | 2/2004 | Chang | 227/8 |
| 6,745,928 | B2 * | 6/2004 | Ishizawa et al. | 227/130 |
| 7,014,089 | B2 * | 3/2006 | Ishizawa et al. | 227/130 |
| 7,225,961 | B1 * | 6/2007 | Lee | 227/130 |
| 7,290,691 | B1 * | 11/2007 | Wen | 227/8 |
| 7,293,684 | B1 * | 11/2007 | Wen | 227/130 |
| 2006/0261121 | A1 * | 11/2006 | Uchiyama et al. | 227/8 |

FOREIGN PATENT DOCUMENTS

| | | |
|---|---|---|
| JP | 08-025245 | 1/1996 |
| JP | 08-090449 | 4/1996 |
| JP | 09-168976 | 6/1997 |
| JP | 2005-262381 | 9/2005 |

* cited by examiner

*Primary Examiner*—Rinaldi I. Rada
*Assistant Examiner*—Gloria R. Weeks

(57) ABSTRACT

A nail gun includes an air chamber, a main air passage, and a trigger valve with a valve body is disposed between the air chamber and the main air passage. The trigger valve includes a valve bar, an air exhausting passage an air guiding passage and a stopper. The stopper divides the valve body into an upper air chamber and a bottom air chamber. The upper air chamber is connected with the air chamber via the air guiding passage. The bottom air chamber is connected with the upper air chamber via at least one connecting passage disposed in the upper bar portion.

18 Claims, 6 Drawing Sheets

TRIGGER VALVE FOR PNEUMATIC NAIL GUN

BACKGROUND

The present invention relates to trigger valves, and particularly to a trigger valve for use in a pneumatic nail gun. The trigger valve installs a valve bar mechanism, which is capable of being pressed and released.

In general, a trigger with a trigger valve is installed in a gun body of a pneumatic nail gun, adjacent to an end of a compressed air chamber of the pneumatic nail gun. The user can press the trigger to actuate a valve bar in the trigger valve to upwardly move, for guiding the compressed high pressure air to drive a piston to hit nails. The user also can release the trigger to actuate the valve bar to downwardly move to reposit, for guiding the compressed high pressure air to drive the piston to reposit.

A valve bar of a conventional trigger valve includes an upper bar portion nesting the main body of the valve bar, and a bottom bar portion extended out of the trigger valve for being abutted by the trigger. The trigger valve also includes an air tight ring surrounding the upper bar portion, to form a valve stopper, for switching a passage in the states of guiding the high pressure air into the valve, or exhausting the high pressure air. The trigger valve further includes a spring disposed at the upper bar portion, for driving the valve bar to downwardly move to reposit while the trigger being released. The related arts, such as JP Patent No. 08-025245 and JP Patent No. 08-090449 respectively disclosed a typical trigger valve, in which, a valve stopper with larger diameter is integrated with a valve bar, for switching a passage of an air chamber in the trigger valve. Another related art, such as JP Patent No. 09-168976 also disclosed a trigger valve, the valve bar of which formed a ring portion with larger diameter, for abutting and supporting a spring. However, the way of increasing the diameter of the upper portion of the valve bar makes it harder when the user presses the trigger to actuate the valve bar to upwardly move.

Moreover, JP Patent No. 2005-262381 disclosed a valve bar formed a ring portion with larger diameter, for supporting and abutting a spring. The valve bar further nested a moveable valve stopper to switch a passage in the states of guiding the high pressure air into the valve, or exhausting the high pressure air. However, the valve stopper moves in a direction reverse to that of the valve bar during the processes of pressing and releasing the valve bar. That is, besides the problem of harder operation, air barrier is liable to generate between against surfaces of the valve bar and the valve stopper during the processes of pressing and releasing the valve bar. In addition, the high pressure air in the trigger valve cannot assist in overcome the resistance of the valve bar in upwardly/downwardly moving process, which impact the reliability of the operation of the nail gun installed this trigger valve.

Accordingly, what is needed is a trigger valve for pneumatic nail gun that can overcome the above-described deficiencies.

BRIEF SUMMARY

A trigger valve of a pneumatic nail gun, the nail gun has an air chamber and a main air passage, and the trigger valve with a valve body is disposed between the air chamber and the main air passage. The trigger valve includes a valve bar being capable of pressed and released, one end of the valve bar forming an upper bar portion slidably attached inside the valve body, and the other end of the valve bar forming a bottom bar portion extended out of the valve body; an air exhausting passage disposed between the upper bar portion and the valve body, and connecting between the main air passage and environments; an air guiding passage connecting between the main air passage and the air chamber; and a stopper formed at an outside surface of the upper bar portion, the stopper being integrated with the upper bar portion and having a diameter larger than the bottom bar portion, the stopper dividing the valve body into an upper air chamber and a bottom air chamber.

The upper air chamber generates a downwardly pushing force to drive the valve bar to downwardly move, and the bottom air chamber generates a first upwardly pushing force to drive the valve bar to upwardly move and a second upwardly pushing force by pressing the valve bar. The downwardly pushing force is larger than the first upwardly pushing force for used in driving the stopper to close the air exhausting passage and open the air guiding passage. The downwardly pushing force is less than the sum of the first and second upwardly pushing force for used in driving the stopper to open the air exhausting passage and closes the air guiding passage.

In addition, the trigger valve may also includes a stopper sleeve having a diameter larger than that of the bottom bar portion, which is movable attach to an outer surface of the upper bar portion. The stopper sleeve has the same function as the stopper.

With these configurations, the valve bar of the trigger valve generates additional pushing force to drive the valve bar to upwardly move, which prevent the trigger valve form harder operation when the stopper or stopper sleeve with larger diameter upwardly moved along the valve bar. Moreover, the stopper moves in a direction the same as that of the valve bar. That is, the phenomenon of air barrier in the trigger valve is avoided, and the reliability of controlling the passage by the valve bar is improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
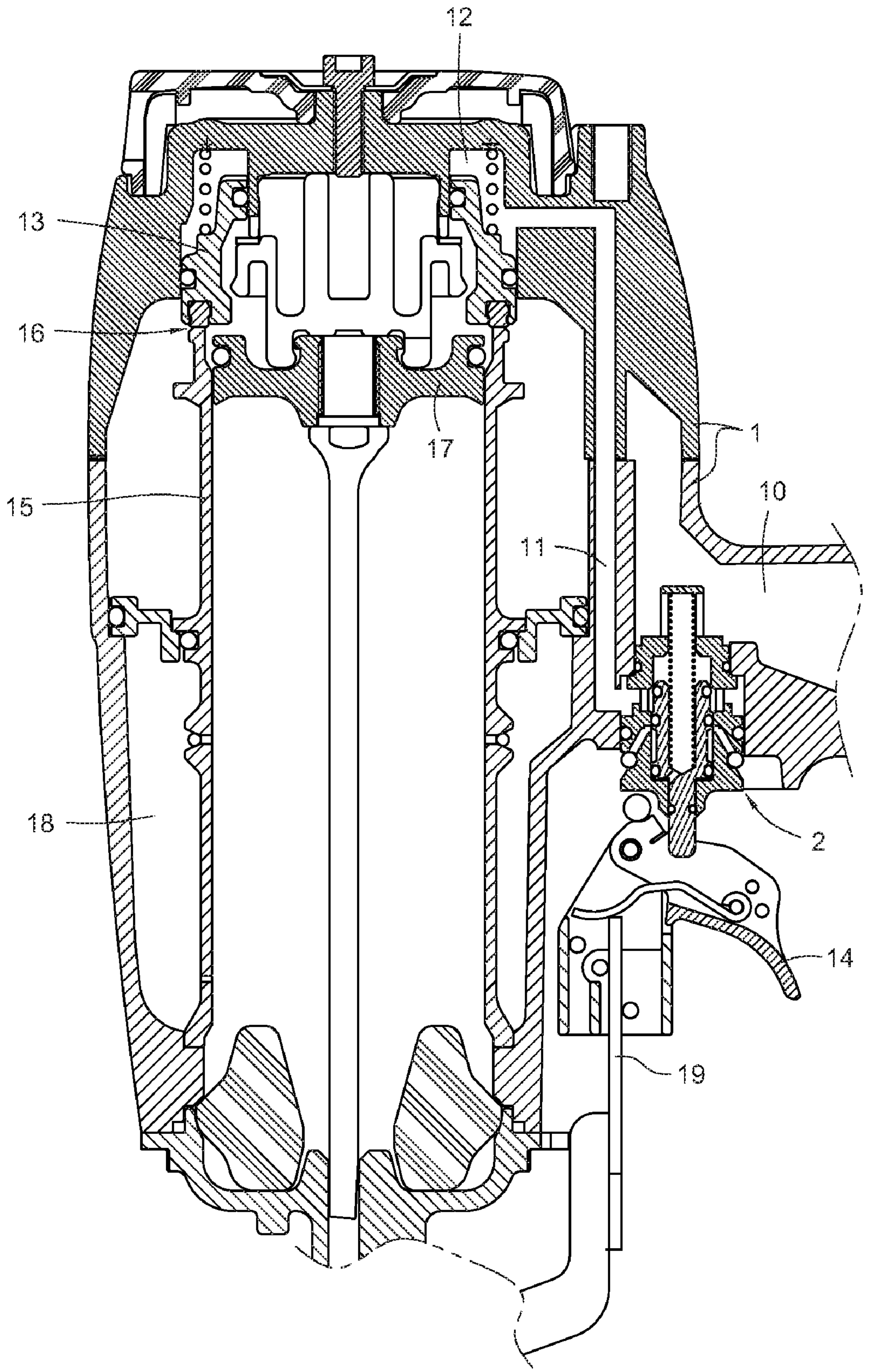
FIG. 1 is a schematic, cross-sectional view of part of a nail gun installing a trigger valve according to an exemplary embodiment of the present invention.
Figure 2:
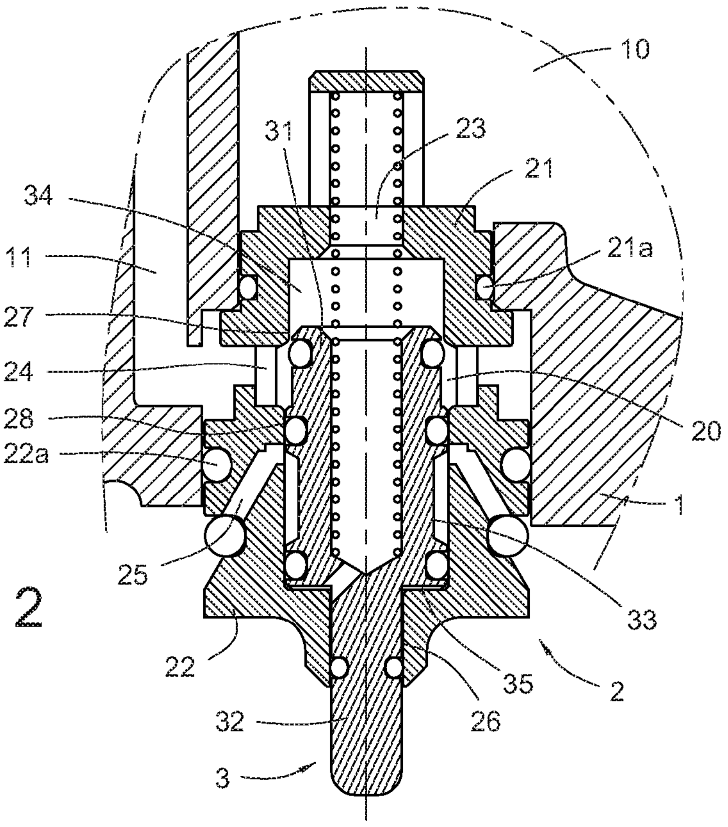
FIG. 2 is an enlarged, cross-sectional view of the trigger valve of FIG. 1.

Referring to FIGS. 1-2, FIG. 1 is a schematic, cross-sectional view of part of a nail gun installing a trigger valve according to an exemplary embodiment of the present invention, and FIG. 2 is an enlarged, cross-sectional view of the trigger valve of FIG. 1. The gun body 1 includes an air chamber 10, a main air passage 11, and a trigger valve 2 with a valve body disposed between the air chamber 10 and the main air passage 11.

The trigger valve 2 fixed to the gun body 1 includes an upper base 21 and a bottom base 22. An air tight ring 21*a* and an air tight ring 22*a* are respectively disposed on the upper base 21 and the bottom base 22 to closely contact with the gun body 1. The trigger valve 2 includes an air inputting through hole 23 disposed at a top portion of the upper base 21, which is connected with the air chamber 10 for guiding compressed high pressure air into the trigger valve. The trigger valve 2 also includes at least one through hole 24 disposed between the upper and bottom bases 21 and 22, which is connected with the main air passage 11 for guiding the high pressure air in the trigger valve 2. The trigger valve 2 further includes at least one through hole 25 disposed at an end portion of the bottom base 22 for exhausting high pressure air. The trigger valve 2 further includes a valve hole 26 disposed at a bottom portion of the bottom base 22, and connecting with environments. Moreover, the trigger valve 2 includes a slot chamber 20 disposed between the upper and bottom bases 21 and 22. In addition, the trigger valve 2 includes a valve port 27 connected between the through holes 23 and 24 for guiding compressed air thereinto, and a valve port 28 connected between the through holes 24 and 25 for exhausting compressed air out of the trigger valve 2.

The air chamber 10 can guide and concentrate external air thereinto and maintain a high pressure therein. The main passage 11 is connected with an air chamber 12 in the gun body 1, and the air chamber 12 is used for hitting nails. In this illustrated embodiment, the air chamber 12 is an upper air chamber of a main air piston 13. When a trigger 14 of the gun body 1 is not pressed or is released, the high pressure air are compressed in the air chamber 10 and the main air passage 11, to drive the main air piston 13 to close the fluid communication between a main valve port 16 and a cylinder 15. When the trigger 14 and a security slide rod 19 are pressed, high pressure air in the main air passage 11 and the air chamber 12 are exhausting, to drive the main air piston 13 to open the valve port 16, so as to guide high pressure air into the cylinder 15 for actuating a piston 17 to downwardly move to hit nails. At the same time, high pressed air are concentrated in a return air chamber 18 for use in drive the piston 17 to reposit when release the trigger 14 and the security slide rod 19. The trigger valve 2 is capable of switching the states of the main air passage 11 are illustrated in above embodiment, but the structure of which is not limited. The nail gun having a trigger valve that is capable of switching the states of the main air passage 11 can be installed in this invention.

The trigger valve 2 includes a valve bar 3, one end of which forms an upper bar portion 31 slidably attached to the slot chamber 20, and the other end of the valve bar 3 forms a bottom bar portion 32 extended to environment via the valve hole 26. The upper bar portion 31 includes an air exhausting passage 41 connected between the main air passage 11 and the environment, and an air guiding passage 42 connected between the air chamber 10 and the main air passage 11. Air tight rings are disposed between the bottom bar portion 32 and the bar hole 26 to close the fluid communications therebetween.

Figure 3:
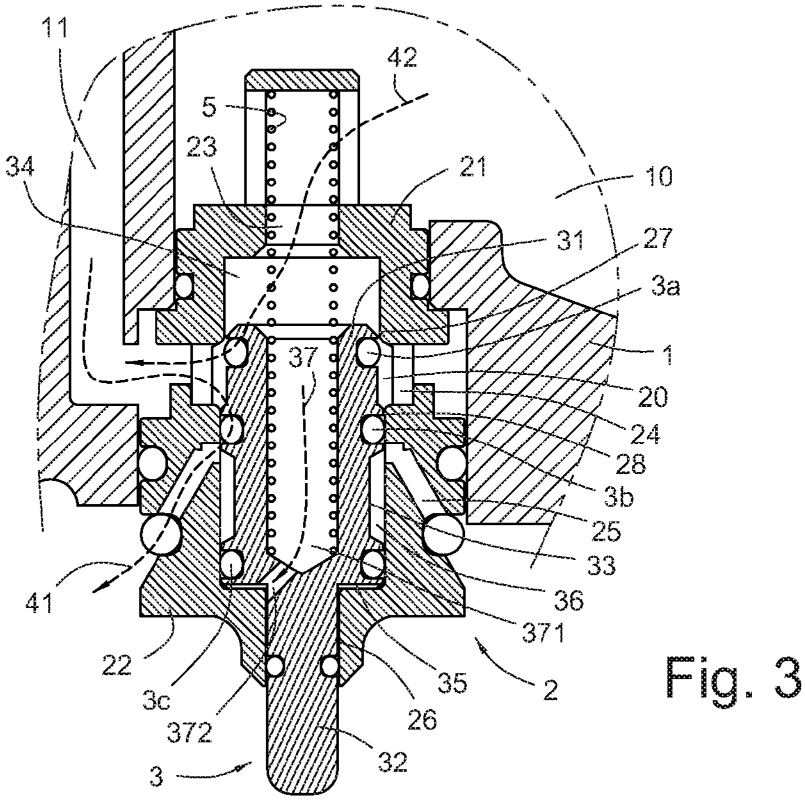
FIG. 3 is an enlarged, cross-sectional view of the trigger valve of FIG. 1, showing passages in the trigger valve.

The upper bar portion 31 forms a stopper 33 at an outside surface thereof, and the stopper 33 is integrated with the bar portion 31 and has a diameter larger than the bottom bar portion 32. The stopper 33 divides the slot chamber 20 into an upper air chamber 34 and a bottom air chamber 35. The stopper 33 includes an upper air tight ring 3*a* for used in turning on/off the air guiding passage 42 (as shown in FIG. 3), a middle air tight ring 3*b* for used in turning on/off the air exhausting passage 41, and a bottom air tight ring 3*c* for used in dividing the upper and bottom air chambers 34 and 35.

The air guiding passage 42 includes the air inputting through hole 23, the valve port 27, and the air guiding through hole 24 connected between the air chamber 10, the upper air chamber 34, and the main air passage 11. The upper air tight ring 3*a* can turn on/off the valve port 27 of the air guiding passage 42.

The air exhausting passage 41 includes an air guiding through hole 24, an air exhausting valve port 28, and an air exhausting through hole 25 connected between the main air passage 11 and environment. The middle air tight ring 3*b* can turn on/off the valve port 28 of the air exhausting passage 41. Furthermore, the stopper 33 further includes an air exhausting ring groove 36 disposed between the middle air tight ring 3*b* and the bottom air tight ring 3*c*, which is connected between the valve port 28 and the through hole 25.

The upper air chamber 34 is connected with the air chamber 10 via the air guiding through hole 23, and the bottom air chamber 35 is connected with the upper air chamber 34 via a connecting passage 37 formed in the upper bar portion 31. The connecting passage 37 may be formed by a spring groove 371 and a hole 372. The spring groove 371 is disposed in the upper bar portion 31 for being used in containing a spring 5, and the hole 372 is disposed between the spring groove 371 and the bottom air chamber 35.

Figure 4:
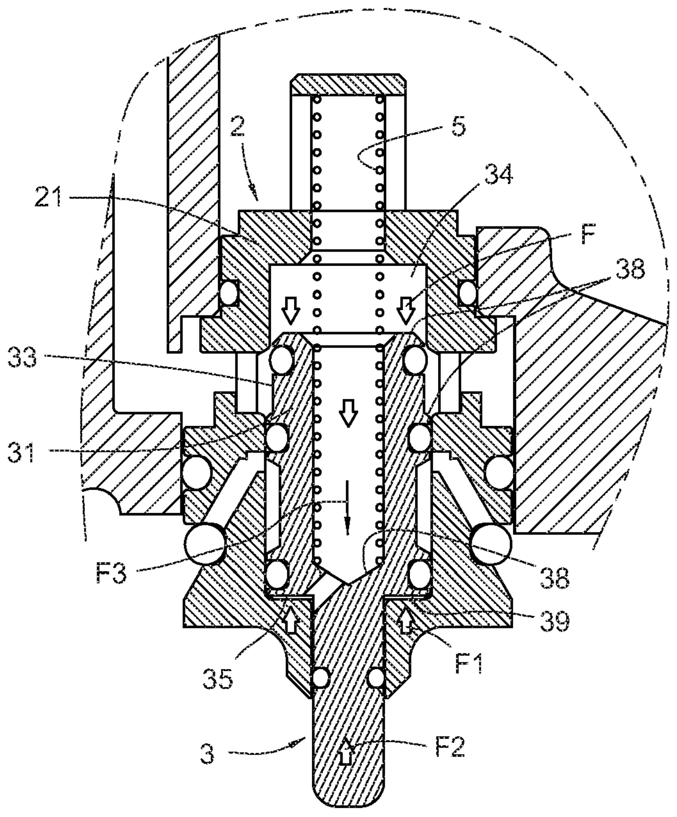
FIG. 4 is an enlarged, cross-sectional view of the trigger valve of FIG. 1, showing a distribution of pushing force generating in the trigger valve.

Referring to FIG. 4, the upper air chamber 34 generates a pushing force F to drive the valve bar 3 to downwardly move, and the bottom air chamber 35 generates a pushing force F1 and a pushing force F2 to drive the valve bar 3 upwardly move. The pushing force F is larger than the pushing force F1, and the pushing force F is less than the sum of the pushing force F1 and the pushing force F2.

Figure 5:
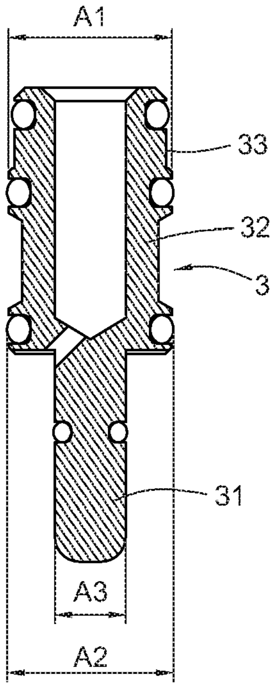
FIG. 5 is an enlarged, cross-sectional view of an upper end surface of a valve bar of the trigger valve of FIG. 1.
Figure 5A:
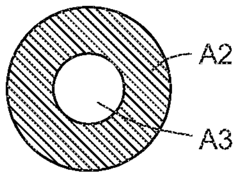
FIG. 5*a* is an enlarged, cross-sectional view of a bottom end surface of the valve bar of the trigger valve of FIG. 1.
Figure 7:
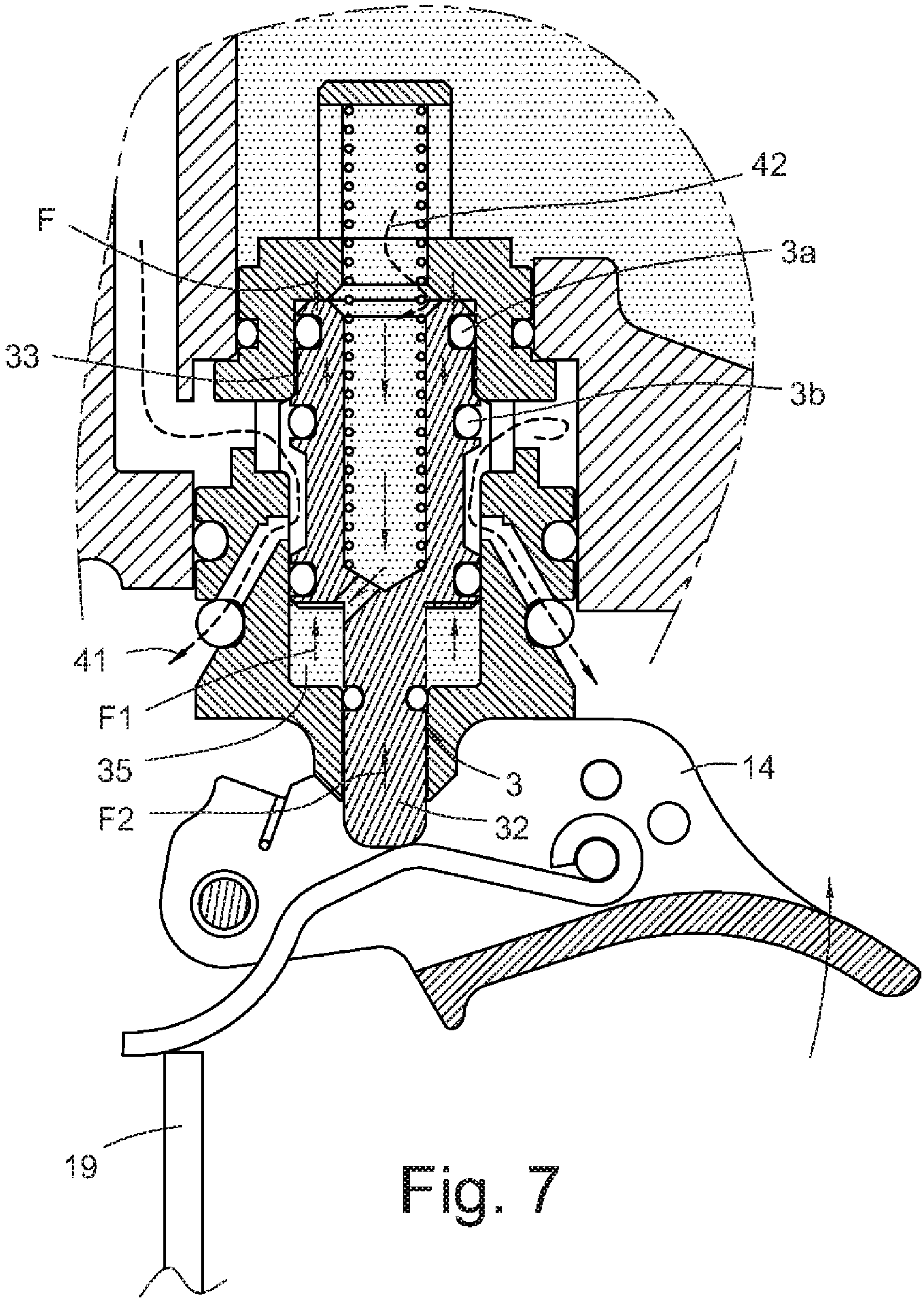
FIG. 7 is an enlarged, cross-sectional view of the trigger valve of FIG. 1, showing a state of the trigger valve being pressed.

In the illustrated embodiment, the pushing force F is generated by the compressed high pressure air in the upper air chamber 34 driving the valve bar 3 to downwardly move, and the pushing force F1 is generated by the compressed high pressure air in the bottom air chamber 35 driving the valve bar 3 to upwardly move, as well as the pushing force F2 is generated by the bottom bar portion 32 upwardly move when being abutted by the trigger 14 (as shown in FIG. 7). One of the stopper 33 and the upper bar portion 31 includes at least one upper end surface 38 (as shown in FIG. 4) to be driven by the compressed air in the upper air chamber 34, and at least one bottom end surface 39 to be driven by the compressed air in the bottom air chamber 35. The area A1 of the upper end surface 38 (as shown in FIG. 5) that driven by the compressed air is larger than the area A2 of the bottom end surface 39 (as shown in FIG. 5*a*) that driven by the compressed air. The area A2 is the portion of the end surface 39 bares to the bottom air chamber 35, and excluding the diameter area A3 of the bottom bar portion 31.

Figure 6:
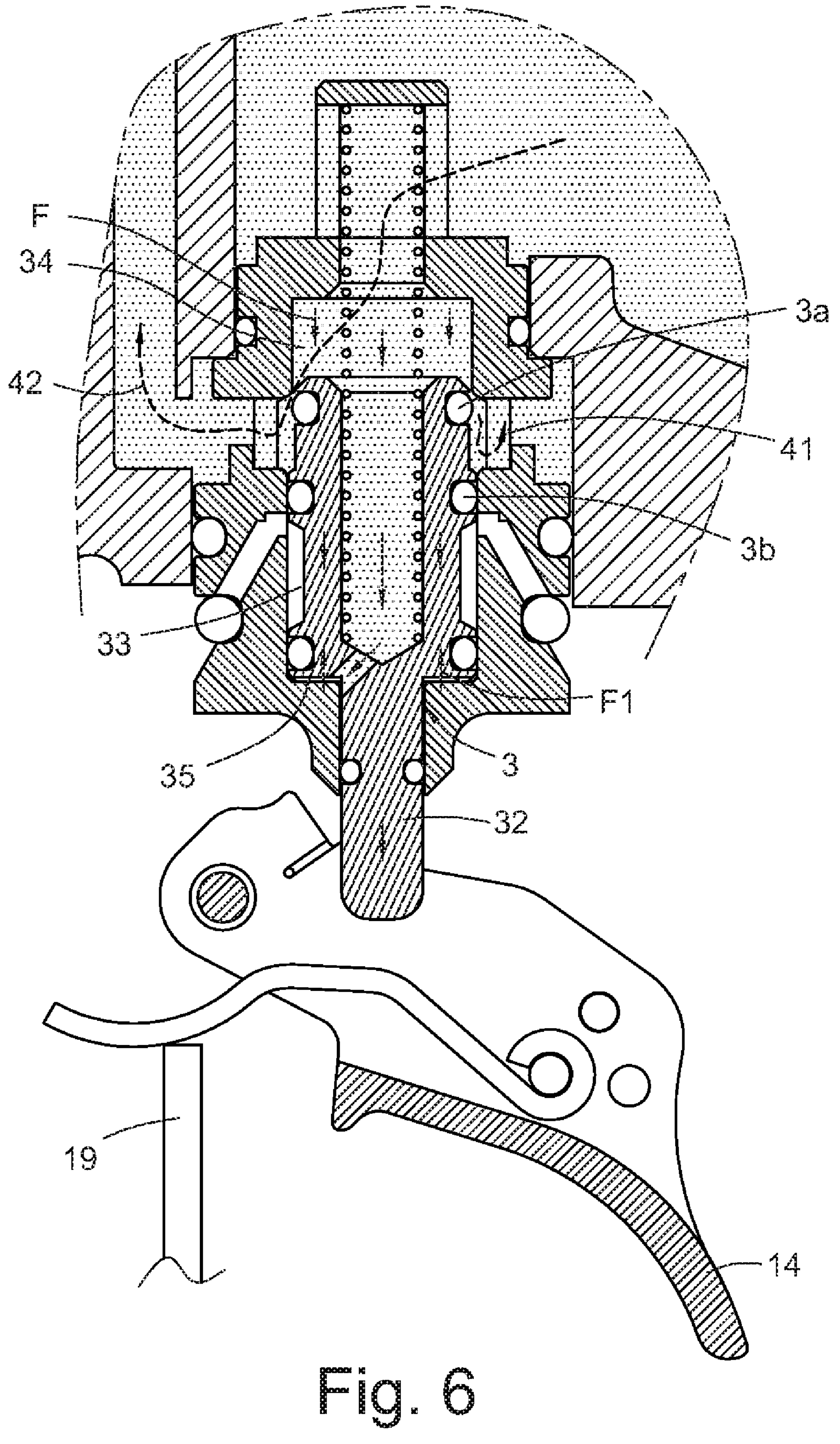
FIG. 6 is an enlarged, cross-sectional view of the trigger valve of FIG. 1, showing a state of the trigger valve before being pressed.

In operation, before the trigger 14 is manipulated as shown in FIG. 6, the pushing force F in the upper air chamber 34 can overcome the pushing force F1 in the bottom air chamber 35, so as to drive the stopper 33 to downwardly move. Meanwhile, the middle air tight ring 3*b* closes the passage 41, and the upper air tight ring 3*a* open the passage 42 to guide high pressure air in the air chamber 10 into the main air passage 11, so as to drive the piston 13 to close the main valve port 16. The nail gun 1 is ready to hit nails.

When the trigger 14 and the bottom bar portion 32 of the valve bar 3 is pulled as shown in FIG. 7, the pushing force F2 is generated. That is, the sum of the pushing force F1 and the pushing force F2 can overcome the pushing force F, to drive the stopper 33 to upwardly move. Meanwhile, the upper air tight ring 3*a* closes the air guiding passage 42, and the middle air tight ring 3*b* open the air exhausting passage 41, for releasing the compressed air in the main air passage 11 to open the main piston 13. Then the high pressure air are guided into the cylinder 15 to drive the nail hitting piston 17 to downwardly move to hit nails.

Then, when the user releases the trigger 14, the trigger valve 2 of the nail gun 1 return to the states before the trigger 14 is manipulated as shown in FIG. 6. The nail gun 1 is ready to be manipulated again.

In another illustrated embodiment, the pushing force F can be the sum of the force of the compressed air in the upper air chamber 34 pressing on the valve bar 3 and the pushing force F3 generated by the spring 5 (as shown in FIG. 4). The spring 5 is disposed between the upper base 21 and the upper bar portion 31. Due to the additional pushing force F3 generated by the spring 5, the area A1 of the upper end surface 38 (as shown in FIG. 5) that driven by the compressed air can be less than or equal to the area A2 of the bottom end surface 39 (as shown in FIG. 5) that driven by the compressed air. With these configurations, it can also realize that driving the stopper 33 to move upwardly or downwardly to control the states of the passages 41 and 42.

According to the embodiments mentioned above, when the area A1 of the upper end surface 38 that driven by the compressed air is larger than the area A2 of the bottom end surface 39 that driven by the compressed air, the spring 5 disposed between the upper base 21 and the upper bar portion 31 can be omitted.

Figure 8:
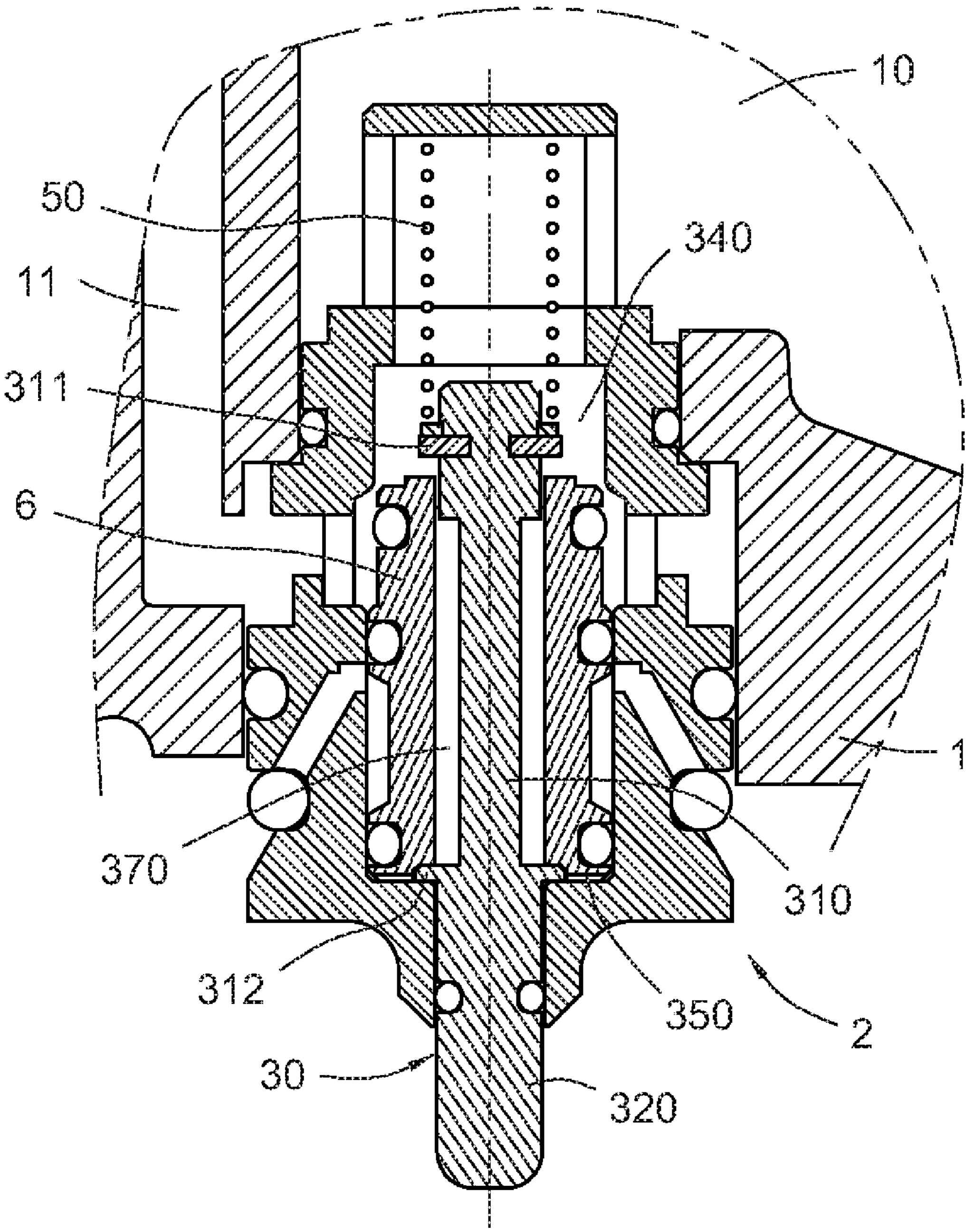
FIG. 8 is an enlarged, cross-sectional view of a trigger valve according to another exemplary embodiment of the present invention.

Referring to FIG. 8, an enlarged, cross-sectional view of a trigger valve according to another exemplary embodiment of the present invention is shown. The trigger valve 2 includes a stopper sleeve 6 with a diameter larger than a bottom bar portion 320. The function of the stopper sleeve 6 is similar to that of the stopper 33, which can move upwardly/downwardly along the valve bar 30. The stopper sleeve 6 is movable attached to an upper bar portion 310, so as to open a connecting passage 370 disposed between an inner surface of the stopper sleeve 6 and an outer surface of the upper bar portion 310. The connecting passage 370 is connected between a bottom air chamber 350 and an upper air chamber 340. The upper bar portion 310 includes a rib ring 311 to bring the stopper sleeve 6 to downwardly move, and a protrusion ring 312 to bring the stopper sleeve 6 to upwardly move. In addition, spring 50 can be disposed between the rib ring 311 of the upper bar portion 310 and an inner surface of the upper base 21. The operation of the stopper sleeve 6 in this embodiment is similar to that of the stopper 33 mentioned above.

With these configurations, the valve bar of the trigger valve generates the addition pushing force F1 and the pushing force F2 to drive the valve bar to upwardly move, which prevent the trigger valve from harder operation when the stopper or stopper sleeve with larger diameter upwardly moved along the valve bar. Moreover, the stopper and the stopper sleeve are disposed attached to the valve bar, which has a moving direction the same as that of the valve bar. That is, the phenomenon of air barrier in the trigger valve is avoided, and the reliability of controlling the passage by the valve bar is improved, which increases the speed ratio and the yield ratio of the operation during the process of continuously hitting nails.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A trigger valve of a pneumatic nail gun, the nail gun having an air chamber and a main air passage, the trigger valve with a valve body being disposed between the air chamber and the main air passage, which comprising:

a valve bar being capable of pressed and released, one end of the valve bar forming an upper bar portion slidably attached inside the valve body, and the other end of the valve bar forming a bottom bar portion extended out of the valve body;

an air exhausting passage disposed between the upper bar portion and the valve body, and connecting between the main air passage and environments;

an air guiding passage connecting between the main air passage and the air chamber; and a stopper formed at an outside surface of the upper bar portion, the stopper being integrated with the upper bar portion and having a diameter larger than the bottom bar portion, the stopper dividing the valve body into an upper air chamber and a bottom air chamber;

wherein the upper air chamber is connected with the air chamber via the air guiding passage, and the bottom air chamber is connected with the upper air chamber via at least one connecting passage disposed in the upper bar portion;

wherein the upper air chamber generates a downwardly pushing force to drive the valve bar to downwardly move, the bottom air chamber generates a first upwardly pushing force to drive the valve bar to upwardly move and a second upwardly pushing force by pressing the valve bar, the downwardly pushing force is larger than the first upwardly pushing force for used in driving the stopper to close the air exhausting passage and open the air guiding passage; the downwardly pushing force is less than the sum of the first and second upwardly pushing force for used in driving the stopper to open the air exhausting passage and close the air guiding passage.

2. The trigger valve as claimed in claim 1, wherein the stopper comprises an upper air tight ring to close or open the air guiding passage, a middle air tight ring to close or open the air exhausting passage, and a bottom air tight ring to divide the valve body into the upper air chamber and the bottom air chamber.

3. The trigger valve as claimed in claim 2, wherein the air guiding passage comprises an air inputting through hole, an air guiding valve port, and an air guiding through hole connected between the air chamber, the upper air chamber and the main air passage, the upper air tight ring is the air guiding valve port for opening or closing the air guiding passage.

4. The trigger valve as claimed in claim 2, wherein the air exhausting passage comprises an air guiding through hole, an air exhausting valve port, and an air exhausting through hole connected between the main air passage and the environments, the middle air tight ring is the air exhausting valve port for opening or closing the air exhausting passage.

5. The trigger valve as claimed in claim 4, wherein the stopper comprises an air exhausting ring groove disposed between the middle air tight ring and the bottom air tight ring, and connecting between the air exhausting valve port and the air exhausting through hole.

6. The trigger valve as claimed in claim 1, wherein the downwardly pushing force is generated by compressed high pressure air in the upper air chamber driving the valve bar to downwardly move.

7. The trigger valve as claimed in claim 6, wherein one of the stopper and the upper bar portion comprises at least one upper end surface being driven by the compressed air in the upper air chamber, and at least one bottom end surface being driven by the compressed air in the bottom air chamber, the area of the upper end surface that driven by the compressed air is larger than that of the bottom end surface.

8. The trigger valve as claimed in claim 1, further comprising a spring disposed between the valve body and the upper bar portion, wherein the downwardly pushing force is the sum of the pushing force generated by compressed air in the upper air chamber and the pushing force generated by the spring.

9. The trigger valve as claimed in claim 1, wherein the stopper is a stopper sleeve with a diameter larger than that of the bottom bar portion, and the stopper sleeve is movably attached to outer surface of the upper bar portion that is driven by the valve bar.

10. The trigger valve as claimed in claim 9, wherein the upper air chamber is connected with the air chamber via the air guiding passage, and the bottom air chamber is connected with the upper air chamber via an air guiding ring groove disposed between the inner surface of the stopper sleeve and the outside surface of the upper bar portion.

11. The trigger valve as claimed in claim 9, wherein the stopper sleeve comprises an upper air tight ring to close or open the air guiding passage, a middle air tight ring to close or open the air exhausting passage, and a bottom air tight ring to divide the valve body into the upper air chamber and the bottom air chamber.

12. The trigger valve as claimed in claim 11, wherein the air guiding passage comprises an air inputting through hole, an air guiding valve port, and an air guiding through hole connected between the air chamber, the upper air chamber and the main air passage, the upper air tight ring is the air guiding valve port for opening or closing the air guiding passage.

13. The trigger valve as claimed in claim 11, wherein the air exhausting passage comprises an air guiding through hole, an air exhausting valve port, and an air exhausting through hole connected between the main air passage and the environments, the middle air tight ring is the air exhausting valve port for opening or closing the air exhausting passage.

14. The trigger valve as claimed in claim 13, wherein the stopper sleeve comprises an air exhausting ring groove disposed between the middle air tight ring and the bottom air tight ring, and connecting between the air exhausting valve port and the air exhausting through hole.

15. The trigger valve as claimed in claim 9, wherein the downwardly pushing force is generated by compressed high pressure air in the upper air chamber driving the valve bar to downwardly move.

16. The trigger valve as claimed in claim 15, wherein one of the stopper sleeve and the upper bar portion comprises at least one upper end surface being driven by the compressed air in the upper air chamber, and at least one bottom end surface being driven by the compressed air in the bottom air chamber, the area of the upper end surface that driven by the compressed air is larger than that of the bottom end surface.

17. The trigger valve as claimed in claim 9, further comprising a spring disposed between the valve body and the upper bar portion, wherein the downwardly pushing force is the sum of the pushing force generated by compressed air in the upper air chamber and the pushing force generated by the spring.

18. The trigger valve as claimed in claim 9, wherein the upper bar portion comprises a rib ring to induce the stopper sleeve to downwardly move, and a protrusion ring to induce the stopper sleeve to upwardly move.

* * * * *